United States Patent [19]
Ogawa et al.

[11] Patent Number: 5,313,539
[45] Date of Patent: May 17, 1994

[54] BRANCHING SECTION OF A SHEATHED MULTICORE OPTICAL FIBER

[75] Inventors: Takahiro Ogawa; Akira Moriguchi, both of Tokyo, Japan

[73] Assignee: The Furukawa Electric Co., Ltd., Tokyo, Japan

[21] Appl. No.: 988,107
[22] PCT Filed: May 26, 1992
[86] PCT No.: PCT/JP92/00678
 § 371 Date: Feb. 10, 1993
 § 102(e) Date: Feb. 10, 1993
[87] PCT Pub. No.: WO92/21994
 PCT Pub. Date: Dec. 10, 1992

[30] Foreign Application Priority Data
May 29, 1991 [JP] Japan .................. 3-153903

[51] Int. Cl.⁵ .............................. G02B 6/36
[52] U.S. Cl. ........................ 385/76; 385/84; 385/134
[58] Field of Search .................. 385/134, 135, 76, 66, 385/68, 69, 81, 84, 100, 102, 109, 106, 112, 147

[56] References Cited

U.S. PATENT DOCUMENTS 4,697,873 10/1987 Bouvard et al. .................. 385/84
4,815,810 3/1989 Betzler et al. .................... 385/81
5,185,840 2/1993 Iapicco .......................... 385/102

*Primary Examiner*—Rodney B. Bovernick
*Assistant Examiner*—John Ngo
*Attorney, Agent, or Firm*—Jacobson, Price, Holman & Stern

[57] ABSTRACT

There is provided an improved branching section of a sheathed multicore optical fiber which is free from twisted and/or bent optical fiber cores during the operation of assembling the component of the branching section so that the operation may be carried out effectively and efficiently to provide a stable branching section of a sheathed multicore optical fiber. Such a branching section is established at an end of a sheathed multicore optical fiber by using stop rings 13, 23 having respective noncircular flanges 13, 22 and a sleeve 27 comprising a plurality of matching oblong members 28a, 28b. Since such a branching section 47 of a sheathed multicore optical fiber is established by using stop rings 12, 21 comprising respective noncircular flanges 13, 22 and a sleeve 27 comprising a plurality of matching oblong members 28a, 28b as well as other components, the branching section is free from any twisted and/or bent optical fiber cores and the operation of establishing such a branching section can be carried out effectively and efficiently to provide a stable branching section of a sheathed multicore optical fiber.

5 Claims, 5 Drawing Sheets

BRANCHING SECTION OF A SHEATHED MULTICORE OPTICAL FIBER

BACKGROUND OF THE INVENTION

1. Field of the Invention

This invention relates to a branching section of a sheathed multicore optical fiber to be realized by an improved branching mechanism.

2. Description of the Related Art

When a sheathed multicore optical fiber is branched, typically a series of operations as described below by referring to FIG. 5(A) through 5(C) of the accompanying drawings are carried out.

Referring firstly to FIG. 5(A), a cylindrical boot 2a having a tapered section and a cylindrical holding member 3a are fitted onto an end portion of a sheathed multicore optical fiber 1 comprising a plurality of strip-shaped optical cords to cover the outer peripheral surface of the sheath 4 at that portion.

Then, the sheath 4 of the multicore optical fiber 1 is partly removed at a very end portion extending from the holding member 3a to expose corresponding end portions of the optical fiber cores 5 and tension-resistive fibrous members 6 it comprises.

Then, a cylindrical sleeve 7 is fitted to the unsheathed end portion of the optical fiber 1 to partly cover the exposed optical fiber cores 5 and, subsequently, tubes 9 each having tension-resistive members 8 are put on the respective remaining end portions of the optical fiber cores 5. Thereafter, a cylindrical holding member 3b and a cylindrical boot 2b having a tapered section is fitted onto the tubes 9 to partly cover the tubes 9.

Then, as shown in FIG. 5(B), the corresponding remaining end portions of the tension-resistive members 6, 8 are placed on the outer peripheral surface of the sleeve 7 at the opposite ends and the holding members 3a, 3b and the boots 2a, 2b are sequentially moved onto the sleeve 7 and securely held there to establish a complete branching section 10 as illustrated in FIG. 5(C).

The end portions of the optical fiber cores 5 of a branching section 10 which is prepared in this manner are protected by a sleeve 7 and respective tubes 9 and made resistive against tension by the sleeve 7 and the end portions of the tension-resistive members 6, 8 secured to the sleeve at the opposite ends thereof so that the branching section 10 is consequently highly resistive against tension.

However, since each of the components of a branching section 10 as illustrated in FIG. 5(C) have a circular cross section, the optical fiber cores 5 in the sleeve 7 can be inevitably twisted and/or bent to damage their transmission capabilities when the components are assembled.

While it is highly desirable to check the established branching section 10, the optical fiber cores 5 in the sleeve 7 are invisible from outside and any twisted and/or bent optical fiber cores 5 are normally left unchecked.

If the sleeve 7 is made of a transparent material and twisted and/or bent optical fiber cores 5 are visible from outside, any efforts of remedying such faulty optical fiber cores 5 can significantly reduce the efficiency of branching operation.

SUMMARY OF THE INVENTION

In view of the above described technological problems, it is, therefore, an object of the present invention to provide an improved branching section of a sheathed multicore optical fiber which is free from twisted and/or bent optical fiber cores during the operation of assembling the component of the branching section so that the operation may be carried out effectively and efficiently to provide a stable branching section of a sheathed multicore optical fiber.

According to the present invention, the above object is achieved by providing a branching section of a sheathed multicore optical fiber characterized in that a stop ring having a noncircular flange is fitted to an end portion of the sheathed multicore optical fiber having exposed optical fiber cores and tension-resistive members, said tension-resistive members are partly folded back on the outer peripheral surface of said stop ring and a holder is fitted thereon so that the stop ring and the folded portions of the tension-resistive members are secured to each other, that another stop ring is fitted to a bundle of as many tubes as the optical fiber cores to be branched, each having a tension-resistive member, the tension-resistive members are partly drawn out of the respective tubes and folded back onto the outer peripheral surface of an end portion of said stop ring and another holder is fitted thereon so that the stop ring and the folded portions of the tension-resistive members are secured to each other while the exposed end portions of the optical fiber cores are drawn out of the sheathed multicore optical fiber and introduced into the respective tubes and that a sleeve comprising a plurality of matching oblong members, each having engaging grooves on the inner surface of the opposite ends for releasable engagement with the respective flanges of the stops rings, is disposed between the stop rings and assembled together in such a manner that the optical fiber cores are covered by the matching oblong members as they are assembled and bundled together so that the engaging grooves on the inner surface of the opposite ends of each of the longitudinal pipes come into engagement with the respective flanges of the stop rings and the bundled longitudinal pipes are rigidly held in position.

A sheathed multicore optical fiber to be used for the purpose of the present invention typically comprises a number of strip-shaped optical cords.

Strip rings to be coupled for the purpose of the present invention may comprise a small diameter section at an end, a large diameter section at the opposite end and a noncircular flange between the small and large diameter sections.

The noncircular flange is realized in the form of a notched circle, a polygon, an ellipse, a gear-shape or a figure having an undulated or zigzag profile.

The tension-resistive members of tubes to be used for the purpose of the present invention may be made of fabric.

Since the optical fiber cores drawn out of a sheathed multicore optical fiber for a branching section according to the present invention are separated from one another and covered by respective tubes and a sleeve, they are consequently securely protected by the tubes and the sleeve. Besides, since the tension-resistive members of the sheathed multicore optical fiber and those of the tubes are secured to the common sleeve by means of stop rings and holders, the branching section is as tension-resistive as any other part of the sheathed multicore optical fiber.

A branching section according to the invention is realized by arranging a sleeve comprising a plurality of matching oblong members between a pair of stop rings in the final stages of branching operation subsequent to fitting given components of the branching section respectively to an end portion of a sheathed multicore optical fiber and a number of tubes and introducing predetermined optical fiber cores into respective tubes. Thus, twisted and/or bent optical fiber cores, if any, can be checked and corrected any time before the sleeve is finally fitted to the branching section to complete the branching operation.

Additionally, since the noncircular flanges of the stop rings and the engaging grooves formed on each of the matching oblong members of the sleeve serve as means of checking relative rotation of these components, the sleeve is prevented from any undesirable rotation when it is fitted to the branching section to complete the branching operation.

It may be clear that a branching section of a sheathed multicore optical fiber according to the invention and having a configuration as described above is completely free from twisted and/or bent optical fiber cores.

For establishing a branching section according to the present invention, since the operation of fitting components to an end portion of a sheathed multicore optical fiber and that of fitting components to tubes are independently conducted and a sleeve is attached to the branching section in the final stages to complete the branching operation, no interference can take place between these operations and the entire operation of establishing a branching section can be carried out in a relatively simple manner as the sleeve only needs to be fitted to a given position of the branching section from outside.

Finally, once arranged in position, the sleeve is not axially nor radially movable relative to both the corresponding end portion of the sheathed multicore optical fiber and those of the optical fiber cores and, therefore, the branching section can remain stable for a prolonged period of time.

BEST MODE OF CARRYING OUT THE INVENTION

Now, the present invention will be described in greater detail by referring to the accompanying drawings that illustrate a preferred embodiment of the invention.

In FIGS. 1(A) through 1(G), 11 denotes a fastening ring, 12 a stop ring, 16 a ring-shaped holder, 17 a boot, 20 a ring-shaped holder, 21 another stop ring, 25 a backup tube, 27 a sleeve and 32 a clamp ring.

Figure 1A:
FIGS. 1(A) through 1(I) are schematic views illustrating the components of a branching section according to the present invention.
Figure 1B:
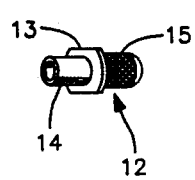
Figure 1C:
Figure 1D:
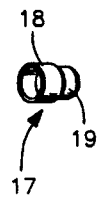
Figure 1E:
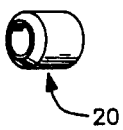

While the fastening ring 11 and the holders 16 and 20 have a relatively simple form as respectively shown in FIGS. 1(A), 1(C) and 1(E), the remaining components may require an additional description on the configuration.

The stop ring 12 as illustrated in FIG. 1(A) is provided with a noncircular flange 13 disposed at the middle of its length and divided into a smaller diameter section 14 and a larger diameter section 15 by the flange 13.

The outer peripheral surface of the larger diameter section 15 is processed for antislip typically by means of a roulette.

The boot 17 as illustrated in FIG. 1(D) comprises a larger diameter section 18 and a smaller diameter section 19 successively arranged in the axial direction having an end closed by a wall which is provided with through bores (not shown) for receiving optical fiber cores, the number of the through bores being equal to that of the optical fiber cores to be received by the bores.

Figure 1F:
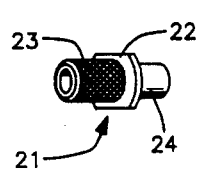
Figure 1G:

The stop ring 21 as illustrated in FIG. 1(F) is also provided with a noncircular flange 22 and divided into a larger diameter section 23 having a outer peripheral surface processed for antislip and a smaller diameter section 24 by the flange 22.

The tube 25 as illustrated in FIG. (G) is provided with tension-resistive members 26 made of fiber and disposed along the inner peripheral surface or in a thick section of the tube 25.

Figure 1H:
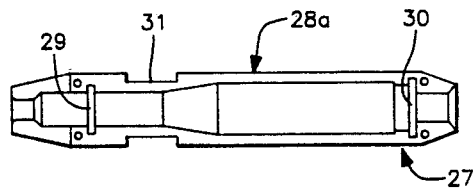

The sleeve 27 as illustrated in FIG. 1(H) is formed by assembling a plurality of matching oblong members (symmetrical two halves of the sleeve in FIGS. 1(H) 28a, 28b formed by axially dividing the sleeve. These oblong symmetrical halves 28a, 28b have an inside profile adapted to contain or receive the above listed components and provided with a pair of engaging grooves 29, 30 for engagedly receiving the respective noncircular flanges 13, 22 and an external recess 31 on the outer peripheral surface for receiving the clamp rings 32.

Figure 1I:
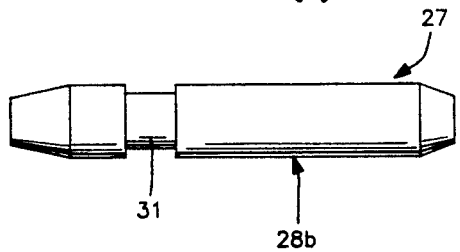
Figure 1J:
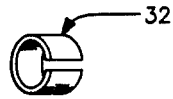

The clamp ring 32 is cut along an axial line as illustrated in FIG. 1(I).

Of the above described components, the boot 17 and the tubes 25 are made of either rubber or synthetic resin, while the rest of the components are typically made of metal, although all or some of the metal components may alternatively be made of synthetic resin (including FRP) and either or both of the rubber or synthetic resin components may be alternatively made of metal. The tension-resistive members 26 are typically made of a type of aramid fiber marketed with trade name "Cabler."

The flanges 13, 22 of the stop rings 12, 21 are, as described earlier, noncircular.

The flanges may have the form of a notched circle, a polygon, a ellipse, a gear-shape or a figure having an undulated or zigzag profile.

FIGS. 2(A) through 2(E), 3(A) through 3(D) and 4(A) through 4(C) illustrate how a branched section of a sheathed multicore optical fiber 41 is established.

The sheathed multicore optical fiber 41 is a known type and used as an optical cord or cable.

The sheathed multicore optical fiber 41 comprises an outer sheath 42, an inner sheath 43, tension-resistive members 44 made of fiber (e.g., "Cabler") and a plurality of optical fiber cores 46 and has a circular or flat and rectangular cross section.

Figure 2A:
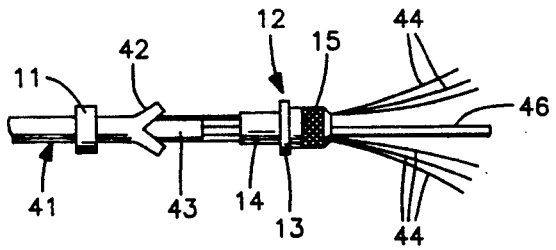
FIGS. 2(A) through 2(E) are schematic views illustrating the procedures with which a holding mechanism is set up on an end portion of a sheathed multicore optical fiber by using a stop ring and other components.
Figure 3A:
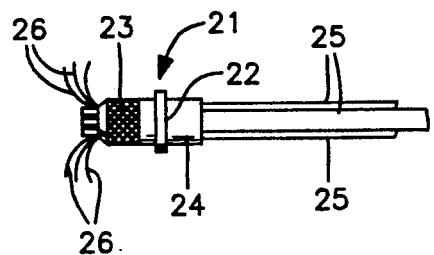
FIGS. 3(A) through 3(D) are schematic views illustrating the procedures with which a holding mechanism is set up on tubes by using a stop ring and other components.
Figure 3B:
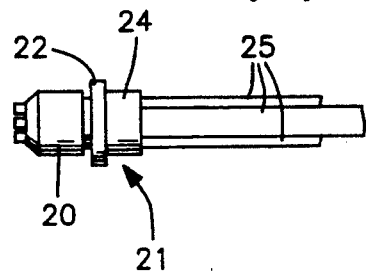
Figure 3C:
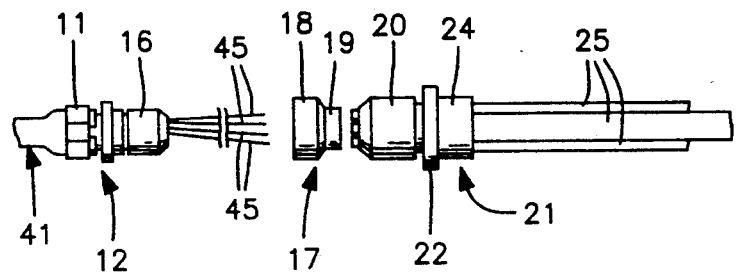
Figure 3D:
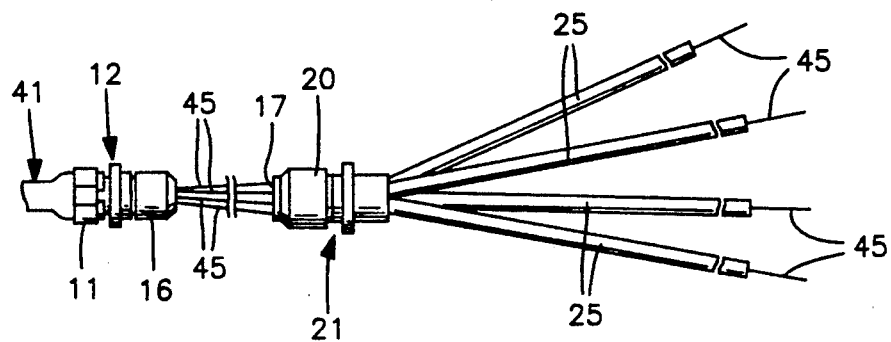
Figure 4A:
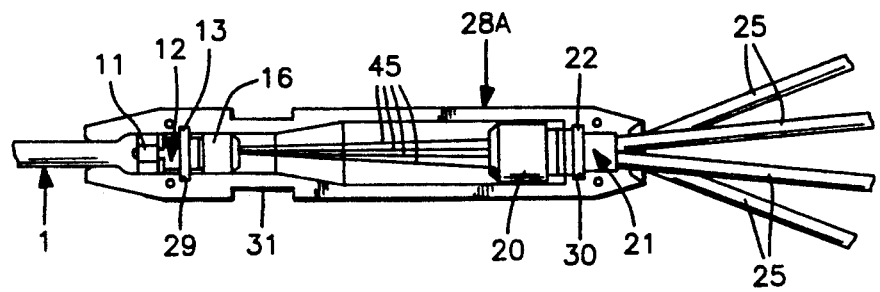
FIGS. 4(A) through 4(C) are schematic views illustrating how a sleeve is fitted to the two holding mechanisms.
Figure 4B:
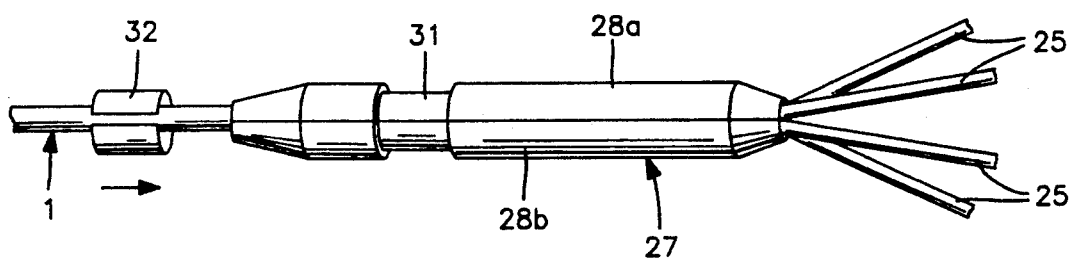
Figure 4C:
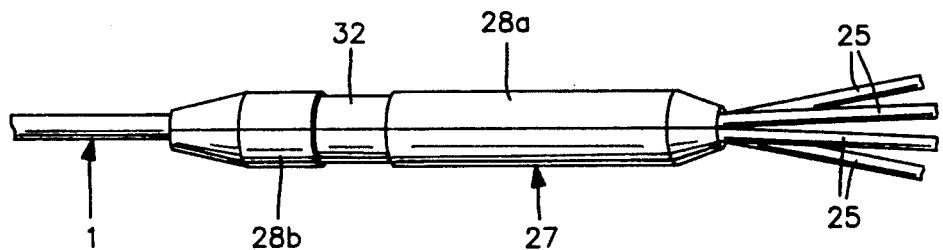
Figure 5A:
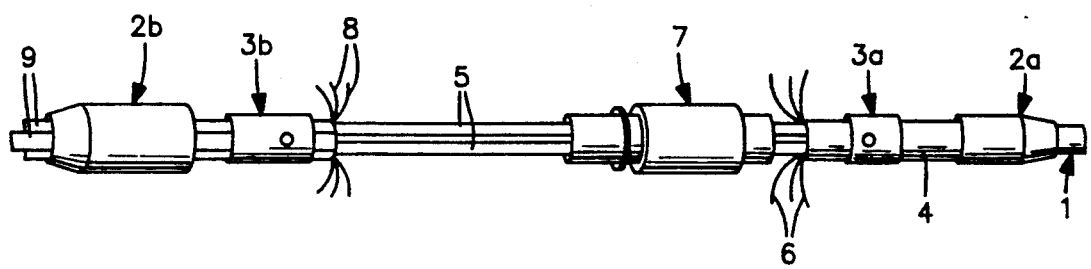
FIGS. 5(A) through 5(C) are schematic views illustrating how a conventional branching section is established.
Figure 5B:
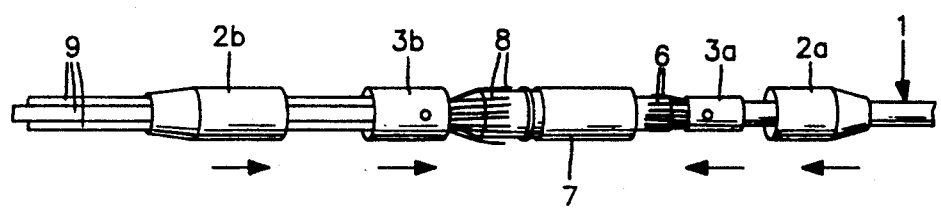
Figure 5C:
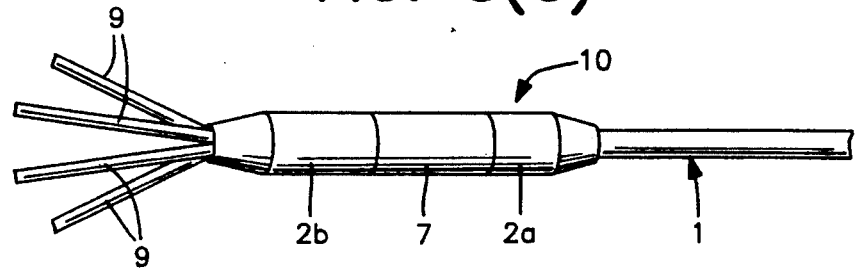

A branching section of a sheathed multicore optical fiber 41 according to the invention is established by following the processing steps as illustrated in FIGS. 2(A), then those as illustrated in FIGS. 3(A) through 3(D) and finally those as illustrated in FIGS. 4(A) through 4(C). These steps will now be described.

Referring firstly to FIG. 2(A), the outer sheath 42 and the inner sheath 43 are partly removed from an end of the sheathed multicore optical fiber 41 to partly expose tension-resistive members 44 and the optical fiber cores 46.

More specifically, a fastening ring 11 is fitted to the end of the sheathed multicore optical fiber 41 from outside and then an end portion of the outer sheath 42 is cut apart. Thereafter, the exposed tension-resistive members 44 and optical fiber cores 46 are made to pass through a stop ring 12.

Figure 2B:
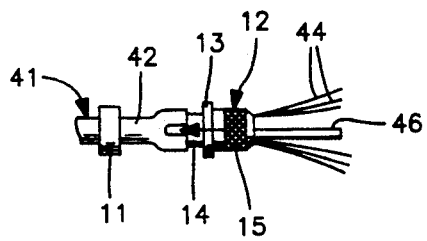

Then, referring to FIG. 2(B), the stop ring 12 is pushed leftward (in the direction as indicated by an arrow) and its smaller diameter section 14 is forcibly inserted between the outer sheath 42 and the inner sheath 43.

Figure 2C:
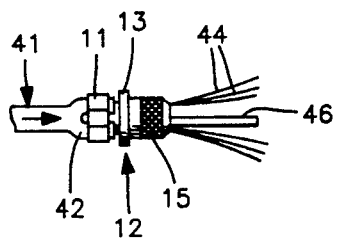

Now, referring to FIG. 2(C), the fastening ring 11 is moved rightward (in the direction as indicated by an arrow) to surround the portion of the outer sheath 42 swollen by the insertion of the smaller diameter section 14 of the stop ring 12 and then locked there by known locking means.

Thus, the locked stop ring 12 is rigidly secured to the sheathed multicore optical fiber 41 near the end thereof.

Figure 2D:
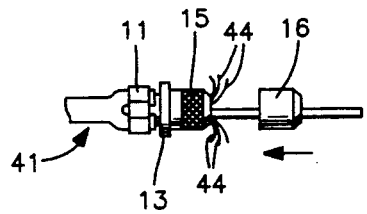

Referring to FIG. 2(D), the exposed tension-resistive members 44 are folded back on the outer peripheral surface of the larger diameter section 15 of the stop ring 12 and a ring-shaped holder 16 that has been fitted on the sheathed multicore optical fiber 41 to surround the latter is pushed leftward (in the direction as indicated by an arrow) to cover the folded back portions of the tension-resistive members 44.

Thus, the folded back portions of the tension-resistive members 44 are pinched by the larger diameter section 15 of the stop ring 12 and the holder 20.

Figure 2E:
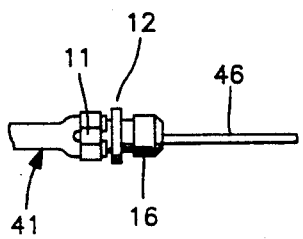

Then, referring to FIG. 2(E), the holder 16 is locked there by known locking means and the folded back portions of the tension-resistive members 44 are securely held to respective given positions by the locked holder 16.

Referring to FIG. 3(A), on the other hand, a plurality of tubes 25 are bundled by another stop ring 21 that surround the tubes 25 from outside and the tension-resistive members 26 of the tubes are partly exposed at an end thereof.

Then, referring to FIG. 3(B), the exposed tension-resistive members 44 are folded back onto the outer peripheral surface of the large diameter section 23 of the stop ring 21 and a ring-shaped holder 20 is fitted thereon to pinch the folded back portions of the tension-resistive members 26 are pinched by the large diameter section 23 and the holder 20.

Thereafter, the holder 20 is locked by known locking means so that the folded back portions of the tension-resistive members 26 are securely held to respective given positions.

Then, referring to FIG. 3(C), a boot 17 is fitted into the larger diameter section 23 of the stop ring 21 and end portions of optical fiber cores 46 of the sheathed multicore optical fiber 41 are separated into individual optical fibers 45, which are then made to pass through the respective through bores of the boot 17 and drawn into the respective tubes 25.

Now, the processed end portions of the sheathed multicore optical fiber 41 and those of the tubes 25 appear as the schematic illustration of FIG. 3(D).

Referring to FIG. 4(A), the holding mechanisms respectively comprising the stop rings 12, 21 and the single core optical fibers 45 connecting them are placed in an oblong member 28 of a sleeve 27 in such a manner that the flanges 13, 22 of the respective stop rings 12, 21 become engaged with the respective engaging grooves 29, 30 of the oblong member 28a.

Since the flanges 13, 22 and the engaging grooves 29, 30 have a non circular circumference, the holding mechanisms comprising the respective stop rings 12, 21 would not rotate in the oblong member 28a to twist the optical fibers 45.

Then, referring to FIG. 4(D), another oblong member 28b is placed in position on the matching oblong member 28a so that the two matching oblong members 28a, 28b are properly assembled together.

Under this condition, the engaging grooves 29, 39 of the oblong member 28b are also engaged with the respective flanges 13, 22.

If the matching surfaces of the oblong members 28a, 28b respectively carry projections and recesses for mutual alignment, they may be easily and unmistakably assembled together as the projections are received by the respective recesses.

Now, the holding mechanisms respectively comprising the stop rings 12, 21 and the single core optical fibers 45 connecting them are totally covered by the sleeve 27.

Referring to FIG. 4(C), a clamp ring 32 is fitted to the external recess 31 of the sleeve 27 to securely hold the matching oblong members 28a, 28b together and complete the operation of establishing a branching section 47.

It may be understood that the matching oblong members 28a, 28b of the sleeve 27 of the branching section 47 can be separated from each other by removing the clamp ring 32.

Any of the components of a branching section 47 of a sheathed multicore optical fiber 41 according to the invention may be appropriately modified or altered so long as it remains compatible with the remaining components.

It should be noted that some of the components of a branching section 47 of a sheathed multicore optical fiber 41 according to the invention may well be releasably linked, connected, fitted or held to respective matching components, whereas others are unreleasable and permanently secured to respective matching parts.

INDUSTRIAL APPLICABILITY

Since a branching section of a sheathed multicore optical fiber according to the invention is established at an end of the sheathed multicore optical fiber by using stop rings comprising noncircular flanges and a sleeve comprising a plurality of matching oblong members as well as other components, the operation of establishing a branching section using such stop rings and a sleeve is free from any twisted and/or bent optical fiber cores and can be carried out effectively and efficiently to provide a stable branching section of a sheathed multicore optical fiber.

What is claimed is:

1. A branching section of a sheathed multicore optical fiber characterized in that a stop ring having a noncircular flange is fitted to an end portion of the sheathed multicore optical fiber having exposed optical fiber cores and tension-resistive members, said tension-resistive members are partly folded back on the outer peripheral surface of said stop ring and a holder is fitted thereon so that the stop ring and the folded portions of the tension-resistive members are secured to each other, that another stop ring is fitted to a bundle of tubes, wherein there are as many tubes as there are optical fiber cores to be branched, each tube having a tension-resistive member, the tension-resistive members are partly drawn out of the respective tubes and folded back onto the outer peripheral surface of an end portion of said stop ring and another holder is fitted thereon so that the stop ring and the folded portions of the tension-resistive members are secured to each other while the exposed end portions of the optical fiber cores are drawn out of the sheathed multicore optical fiber and introduced into the respective tubes and that a sleeve comprising a plurality of matching oblong members, each having engaging grooves on the inner surface of the opposite ends for releasable engagement with the respective flanges of the stops rings, is disposed between the stop rings and assembled together in such a manner that the optical fiber cores are covered by the matching oblong members as they are assembled and joined together so that the engaging grooves on the inner surface of the opposite ends of each of the oblong members come into engagement with the respective flanges of the stop rings and the joined oblong members are rigidly held in position.

2. A branching section of a sheathed multicore optical fiber according to claim 1, wherein the sheathed multicore optical fiber comprises strip-shaped optical cords.

3. A branching section of a sheathed multicore optical fiber according to claim 1, wherein each of the two different stop rings comprises a larger diameter section at an end, a smaller diameter section at the other end and a noncircular flange disposed between the larger diameter section and the smaller section.

4. A branching section of a sheathed multicore optical fiber according to claim 1, wherein the noncircular flange has a form of a notched circle, a polygon, an ellipse, a gear-shape or a figure having an undulated or zigzag profile.

5. A branching section of a sheathed multicore optical fiber according to claim 1, wherein the tension-resistive members of the tubes are made of fiber.

* * * * *